United States Patent

[11] 3,587,237

| [72] | Inventor | Michael A. Pierrat<br>Andover, Mass. |
|---|---|---|
| [21] | Appl. No. | 827,410 |
| [22] | Filed | May 23, 1969 |
| [45] | Patented | June 28, 1971 |
| [73] | Assignee | Automatic Radio Mfg. Co.,<br>Inc., Melrose, Mass. |

[54] CONSTANT SPEED DRIVE
12 Claims, 5 Drawing Figs.

[52] U.S. Cl. .................................................. 60/53
[51] Int. Cl. ........................................... F15b 15/18
[50] Field of Search............................ 60/53, 19, (E), 52, 52 (HE)

[56] References Cited
UNITED STATES PATENTS

| 1,982,711 | 12/1934 | Vickers | 60/52 |
|---|---|---|---|
| 2,395,302 | 2/1946 | Slomer | 60/53X |
| 2,618,932 | 11/1952 | Taup | 60/53 |
| 2,984,985 | 5/1961 | MacMillin | 60/52HEX |
| 3,312,059 | 4/1967 | Stuteville | 60/52 |

Primary Examiner—Edgar W. Geoghegan
Attorneys—James E. Mrose and Mary C. Thomson ABSTRACT: A constant-speed rotary drive operating at high efficiency includes a hydraulic motor within a closed fluid circuit which has a fluid bypassing and multiple-pumping arrangement for maintaining a constant rate of fluid flow to the hydraulic motor. Two or more rotary pumps are driven at the same or related speeds by a variable-speed power input device, and an automatic valving arrangement, responsive to conditions characterizing the flows which must be bypassed to operate the motor at constant speed, selectively channels the output flows from the pumps in sequences and combinations which insure that the power losses associated with flow in the bypass for the hydraulic motor are minimized for all ranges of input-speed variations.

INVENTOR
MICHEL A. PIERRAT

CONSTANT SPEED DRIVE

BACKGROUND OF THE INVENTION

The present invention relates to improvements in apparatus for deriving power outputs at substantially constant speed from a variable-speed power source, and, in one particular aspect, to a novel and improved hydraulic system, for converting a variable-speed rotational power input into a constant-speed rotational drive, wherein a rotary hydraulic motor is associated with a fluid bypass which regulates the flow of fluid to the motor to a constant rate and in turn uniquely controls a multiple-pump and valving arrangement which reduces to advantageously low values the permissible major power losses due to fluid bypassing.

Rotational sources of power having fluctuating or variable output speeds are relatively commonplace and inexpensive, and, although such sources may be suitable for supplying power for many purposes which do not involve a critical dependence upon speed, there are other well-known applications which demand closely regulated constant-speed drives. An outstanding example of the latter is found in the generation of auxiliary alternating-current electrical power, where the frequency is determined by the speed at which the generator armature is rotated by a prime mover; speed-regulated power sources serving such needs tend to be costly and/or bulky and/or inefficient. The difficulties are even more serious where the prime mover, such as an internal combustion engine, must traverse a large range of speeds. By way of an important example, it could be highly advantageous in the trucking industry to use commercial-frequency AC generators to power auxiliary refrigeration equipment, conveying equipment, auxiliary lighting, and the like, with the result that the on-board equipment would advantageously be fully compatible for operation from commercial power lines when the truck engines are not running or an engine cab is separated from a trailer. In attempting to generate AC electrical power via the engine of a vehicle such as trucks, automobile, or camper, one must contend with the fact that the engine speeds will vary widely, from a point of slow idling to very significantly higher speed values at maximum accelerations and travel velocities. Related prior experience in the trucking industry has involved efforts to produce electrical power for refrigeration equipment, by way of an AC generator coupled to the truck engine and therefore necessarily producing a variable-potential, variable-frequency electrical output. Frequency of voltage-regulated outputs from such a system may vary appreciably, as from near 0 to 600 c.p.s., for example, and it is therefore necessary to rectify the output to produce substantially constant DC power which can then excite a DC motor and compressor for the refrigeration equipment. So long as the vehicle engine is functioning at appropriate speeds, the refrigeration equipment will function also, but, during long layover periods and certain stops, it can be highly desirable, if not essential, to shut down the vehicle engine or to detach a refrigerated trailer from a cab, and thus cut off the power source. For such reasons, it has been a practice to make additional use of a readily available commercial-frequency AC power source at the facility where the vehicle is stopped; however, reliance upon such conventional AC power entails the provision of an auxiliary AC motor for running refrigeration equipment, and, as a practical matter, it is found necessary to incorporate a totally redundant AC operated refrigeration system for use during the stopover periods, in addition to the DC system used during periods of truck-engine operation. This redundancy obviously adds undesirably to the cost, size, weight and maintenance problems which are so important in the efficient commercial use of trucks, trailers and the like.

Other efforts aimed at converting the variable-speed power output of a prime mover into a constant-speed power output have involved the use of mechanical and hydraulic apparatus such as a variable-displacement pump in driving relation to a hydraulic motor. Variable-displacement pumps are generally quite expensive, however, and, in addition, tend to be relatively large and to involve onerous maintenance problems. If, instead, one attempts to utilize a constant-displacement hydraulic motor in a fluid system wherein fluid is supplied to the motor by a common type of constant-displacement pump driven at variable speeds by the prime mover, it should be possible to provide a restriction in the hydraulic line to the motor, and a bypass for excess fluid, such that the motor could be induced to run at a substantially constant speed. Unfortunately, in such a system, the flow-control valve through which all bypass fluid must be made to flow will necessarily be responsible for most serious losses in system power when the input speed varies significantly; this is dissipated as heat and requires relatively massive heat exchangers to forestall the buildup of intolerable temperatures. The attendant loss in efficiency, and increased cost of operation renders such systems commercially incapable of satisfying basic interests such as those of the trucking industry. Furthermore, effective exploitation of compatible AC systems for small camping trailers and the like requires that operating cost, size and weight be kept very low. The attractions of efficient and inexpensive compatible conversion equipment are highly pronounced, obviously, inasmuch as all electrical apparatus on board a vehicle may then be of conventional types operative from commercial-frequency lines through the expedient of simple switching.

SUMMARY OF THE INVENTION

By way of a summary account of practice of this invention in one of its aspects, a constant-speed rotational drive is embodied in association with a pair of different-capacity constant-displacement pumps in a closed-loop arrangement with a hydraulic motor and with a fluid bypass circuit, a substantially constant rate of fluid flow to the hydraulic motor being insured, despite significant variations in speeds of a prime mover driving the pumps, by a valving arrangement which responds to bypass flow conditions by channeling the pump outputs to the hydraulic motor individually or in combination, such that the flow in the bypass for the hydraulic motor is kept within prescribed limits for predetermined ranges of allowable speed variations of the prime mover.

Accordingly, it is one of the objects of the present invention to provide novel and improved constant-speed drives of low-cost manufacture which are capable of converting variable-speed power inputs to substantially constant-speed power outputs at high efficiency.

Another object of the invention is the provision of a unique highly useful constant-speed drive of a hydraulic type which automatically selectively exploits from a plurality of ranges of pumped fluid flows the one or ones which most efficiently operate a hydraulic motor at constant speed.

It is a further object to provide compact constant-speed drive which utilize inexpensive pumps, a hydraulic motor, and simple valving components for converting variable-speed power inputs to constant-speed power outputs with overall high efficiency as a result of reduction of power losses associated with different ranges of speed of the power inputs, and which are incorporated in closed fluid networks which can be operated in any position.

Still further, an object of the present invention is the provision of novel and improved constant-speed drive units for electrical alternators which power equipment such as refrigeration system on vehicles by efficiently converting the variable-speed outputs from the vehicle engine to a constant-speed output by way of a pair of inexpensive and uncomplicated constant-displacement pumps and cooperating valves which automatically govern their operational sequences.

BRIEF DESCRIPTION OF THE DRAWINGS

Although the features of this invention which are considered to be novel are set forth in the appended claims, further details as to preferred practices and as to the further objects and features thereof may be most readily comprehended through reference to the following description taken in connection with the accompanying drawings, wherein:

DESCRIPTION OF THE PREFERRED EMBODIMENT

Figure 1:
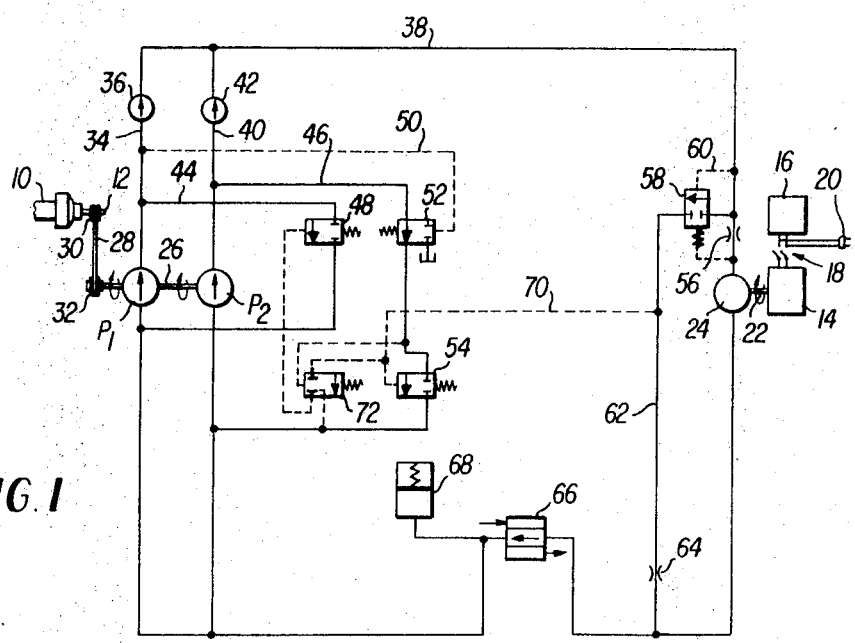
FIG. 1 is a schematic diagram of a constant-speed drive embodying the present invention, in a first state of operation.

Having reference to the drawings, wherein the same reference characters designate identical or functionally corresponding parts throughout the several view, and in the first instance specifically to FIG. 1 thereof, there is designated a variable-speed prime mover such as an internal combustion engine, 10, having a power output shaft 12. This shaft will have a rotational speed which in the case of a vehicle engine, can be expected to change significantly; when the internal combustion engine 10 provides the motive power for a vehicle such as a truck, for example, the speed of the engine, and hence the speed of shaft 12, will vary from a low value, at times when the vehicle is at rest and the engine is idling, to a high value at times of maximum engine and vehicle speeds. For purposes of powering accessory equipment, such as refrigeration equipment, by way of commercial-frequency AC motors, it is necessary to convert the variable-speed output of shaft 12 into a constant-speed power output which may drive an AC generator (alternator) at a uniform rotational speed needed to supply 60-cycle AC power to a motor-compressor unit serving the refrigeration equipment. A constant-speed output device, 14, such as an AC generator (alternator), is shown to be electrically connectable with an AC end device 16, such as a compressor motor for refrigeration purposes, and a switch 18 is provided in the electrical lines between alternator 14 and compressor motor 16 to permit the motor to be disconnected from the generator at times when a conventional commercial-frequency AC power source, represented by plug 20, is instead to be used to power the motor or other end device 16. Alternator 14 is to have its armature shaft 22 rotated at a predetermined speed, thus necessitating conversion of the variable output speed of shaft 12 to that same predetermined speed for the hydraulic motor 24 which is in mechanical driving relation to it. The conversion involves a pumping arrangement including at least a pair of pumps, P1 and P2, driven at the same or related speeds through a shaft 26 which is in turn driven from shaft 12 by means of a drive belt 28 and associated pulleys 30 and 32. Pumps P1 and P2 may each be of a commonplace low-cost constant-displacement type, and can be relatively small, compact, and trouble-free. The pumps P1 and P2 are preferably of different capacities and driven by the same shaft 26, with the result that, although the speeds of the pumps are the same at any time, the output of pump P1 is different from the output of pump P2 at any time. It is also within the contemplation of the present invention that pumps P1 and P2 be of the same capacity, but driven at different speeds through a gearing arrangement or the like, such that their outputs are always of different values to best serve the purposes under discussion here.

The output of pump P1 flows through flow line 34 and a check valve 36 into the main feed line 38 for the hydraulic motor 24, and the output of pump P2 flows through line 40 and a check valve 42 to join the flow from pump P1 in the same main feed line, 38. A first low-loss bypass line 44 is provided for pump P1, and a second low-loss bypass line 46 is independently provided for pump P2. In its condition shown in FIG. 1, a valve 48 in bypass line 44 is closed, or OFF, and no flow occurs through the bypass 44; the entire output from pump P1 will thus enter into line 38 to serve needs of the hydraulic motor 24. Fluid pressure existing within line 34 due to the output of pump P1 will create a back pressure within a monitoring or control line 50 (shown in dashed linework, to distinguish it from flow lines) which is in communication with line 34 and a valve 52 disposed in the bypass flow line 46 for pump P2. Appropriate fluid pressure in line 50 causes valve 52 to be biased to the open, or ON, position, such that fluid pumped by pump P2 would tend to recirculate freely around the low-loss bypass path of line 46 were it not prevented from doing so by a second valve 54 in that line. Valve 54, in its illustrated closed (OFF) condition, forces the entire output of pump P2 to join the output of pump P1 in the main feed line 38. With an internal-combustion vehicle engine in the initial startup period, or otherwise running at a low idle speed, the combined preestablished outputs of pumps P1 and P2 when driven at their minimum speed through shaft 26 will nevertheless suffice to produce in line 38 at least the minimum flow needed to drive the hydraulic motor 24 at a predetermined speed. The illustrated network is of course of a fully closed-loop type, both as to the bypass lines 44 and 46, and as to the main feed line 38, because all of the pumped fluid is continuously recirculated through the pumps and flow lines, except for reserve amounts enclosed in a sump. Flow through line 38 will proceed through a restriction 56, such as that provided by a selected orifice, prior to entering the hydraulic motor 24, and related pressure drops exist across that part of line 38. As the engine speed increases from the lowest level, thus increasing the outputs of pumps P1 and P2, the fluid flow through line 38 increases beyond the needs of the constant-displacement hydraulic motor 24 in driving shaft 22 at the predetermined constant speed. Increased flow through line 38 immediately occasions a greater pressure differential across restriction 56, and this pressure differential is experienced by a main bypass valve 58, through lines such as 60, thus proportionally opening valve 58 to at least a partially ON condition, represented in FIG. 3, for opening the bypass line 62 and thereby shunting around motor 24 fluid in excess of the need of hydraulic motor 24 for operation at the predetermined speed. Flow flowing through bypass line 62 in this manner will in turn create a back pressure therein, due to a restriction 64, such as an orifice, within that line 62. Flow through the proportional-control valve 58 and hydraulic motor 24 will be accompanied by dissipation of energy as heat, and at least a moderate-capacity heat exchanger, 66, is therefore preferably provided for dissipating any excess. The enclosed tank or sump 68 is coupled into the fluid network to maintain a needed pressure and supply to the closed hydraulic network.

As the output speed of prime mover 10 increases still further, the combined outputs from pumps P1 and P2 will correspondingly increase until ultimately the amount of fluid being bypassed through valve 58 and bypass line 62 will tend to become excessive in terms of the amount of related heat, and thus energy, being dissipated via the bypass actions thus described. At that juncture, the interests of system efficiency are served by decreasing the net main-line flow from pumps P1 and P2, such that the loss-inducing bypass flow through main valve 58 and line 62 will be minimized or eliminated. As is understood more readily through reference to FIG. 3, this is achieved automatically by way of a sensing line 70 in pressure communication with bypass line 62. Back pressure is developed in bypass line 62 due to the restriction 64, and will be applied to a pump-controlling valve 54 through sensing line 70. Upon reaching a predetermined pressure level, the sensed back pressure will cause valve 54 to open (turn ON). In that ON condition, valve 54 will permit low-loss through bypass line 46 for pump P2, with the result that substantially the entire output of pump P2 will be withdrawn from the hydraulic motor 24 and will merely be freely circulated through line 46, valves 52 and 54, and pump P2. In the arrangement wherein the capacity of pump P1 is substantially greater than the capacity of pump P2, the flow in the main feed line 38 will therefore be reduced from the excessively high value equal to the combined outputs from pumps P1 and P2 to a lower value equal to the capacity of pump P1 alone, the latter nevertheless being ample to supply the needs of hydraulic motor 24 when pump P1 is rotated at the relatively high speed under consideration.

Figure 2:
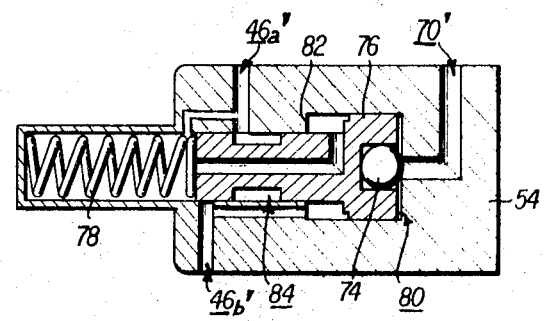
FIG. 2 is a cross-sectional view of a pressure-responsive valve which may be used to advantage in the fluid circuit of the drive of FIG. 1.
Figure 3:
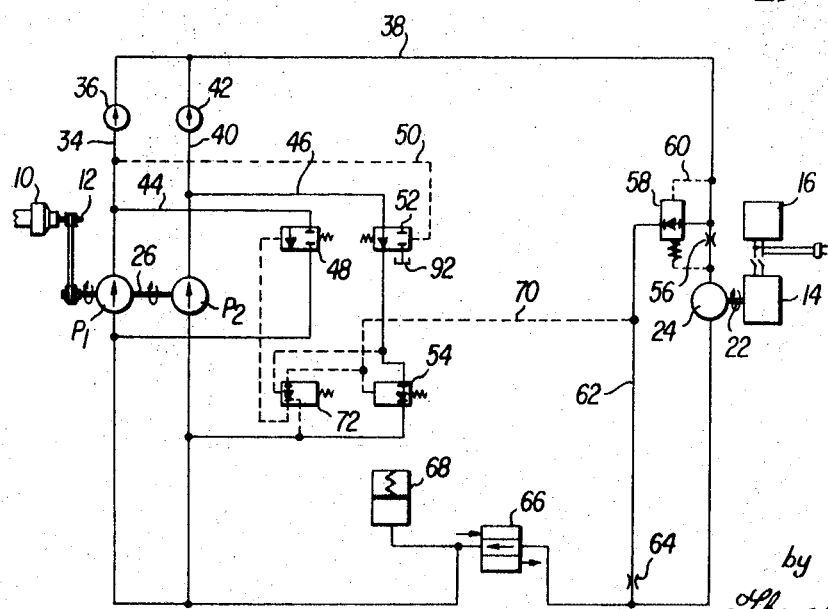
FIG. 3 is a schematic diagram of a drive like that of FIG. 1, in a second stage of operation.
Figure 4:
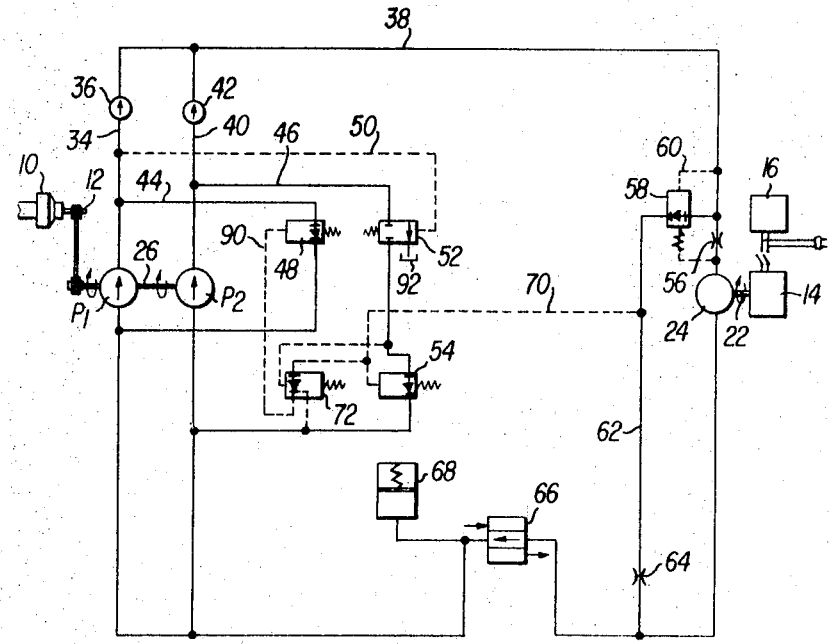
FIG. 4 is a schematic diagram of a drive like that of FIGS. 1 and 3, in a third stage of operation.

Pump-controlling valve 54 is preferably of the type shown in FIG. 2, wherein the valve will not open (turn ON) in response to low pressures, but must instead first experience a relatively high pressure. The control pressure, sensed within line 70 in FIGS. 1, 3 and 4, is exerted upon a relatively small cross section of a ball member 74 in FIG. 2, via the port 70' there, the ball being seated in an enlarged end portion of a larger-area piston member 76. Due to the relatively small cross section of ball 74 upon which the fluid pressure in line 70 is being exerted, it will take a relatively large pressure to open valve 54 by moving piston 76 against its biasing means, shown as a coil spring 78. Once the piston member 76 is moved but a small distance, however, fluid pressure in port 70' is experienced within chamber 80 and is exerted against the relatively large end surface of piston 76. Therefore, once the fluid has sufficed to open the small ball valving portion, the main valving piston 76 will be suddenly snapped to a full open or ON condition and will remain there even under relatively low-pressure conditions in line 70 and port 70' due to the rather large cross-sectional area upon which the fluid pressure is exerted. When piston 76 has snapped to the open condition, bypass fluid from the upper leg of bypass line 46 (FIG. 3) will communicate with the lower leg of the bypass line 46 through upper port 46a', lower port 46b', and a circumferential groove 84 having a longitudinal extent greater than the distance between the upper and low ports (FIG. 2).

As the speed of engine 10 increases beyond the speeds already considered, thus further increasing the output flow from pump P1, fluid flow through bypass 62 will again cause the level of energy dissipated into heat to become excessive, and system efficiency will be correspondingly reduced in that particular cycle of operation. It then becomes desirable to reduce the amount of flow occurring in line 38. This is accomplished automatically by switching from the output flow of higher-capacity pump P1 to the output flow of lower-capacity pump P2, with the flow of pump P1 being circulated freely through the low-loss bypass line 44 and the bypass of pump P2 through line 46 being blocked. This is under control of the increased pressure within sensing line 70, which pressure is communicated through auxiliary valve 72 to a further control line 90 (FIG. 4) which effects the opening of valve 48 from the closed (OFF) condition shown in FIG. 3 to the open (ON) condition shown in FIG. 4. Once valve 48 has been opened in this manner, the pumped output from pump P1 will merely circulate through the low-loss bypass line 44, and pressure in sensing line 50 drops significantly. Upon this reduction in pressure within line 50, valve 52 will close (turn OFF), and the bypass line 46 then no longer will function to withdraw the pumping effects of pump P2 from the circuit to the hydraulic motor 24.

In this third or "highest-speed" mode or stage of operation, the only fluid flow experienced within main feed line 38 will be that produced by the lower-capacity pump P2 alone, which at the highest prime mover speeds, is ample to drive motor 24 at the predetermined speed. A sump 92 is provided in conjunction with valve 52 for draining any excess fluid.

Hydraulic motor 24 of course rotates at the desired predetermined constant speed when it has the same amount of fluid flow through it per unit of time, and when all excess flow is forced to occur within its bypass line 62. It should be understood, also, that the flows of fluid within bypass line 62 will be kept low due to the effects of valves 48, 52, 54 and 72 in cooperation with effects developed via control line 70. Pumps P1 and P2 have been described as utilized in a three-stage system wherein, in a first stage of operation both pumps P1 and P2 are functioning, and in a second stage of operation, when the bypass flow of fluid in line 62 has reached an allowable maximum level, pump P2 will effectively cease to function in the system and the only power-producing flow will be from pump P1, and in a third stage of operation the output from pump P1 will effectively cease to function in the system and the output from pump P2 will feed the sole power-producing flow to the hydraulic motor. Through the use of further control valves in accordance with principles explained herein, additional stages of operation, and heightened efficiency, can be realized in conjunction with use of an increased number of simple constant-displacement pumps.

Figure 5:
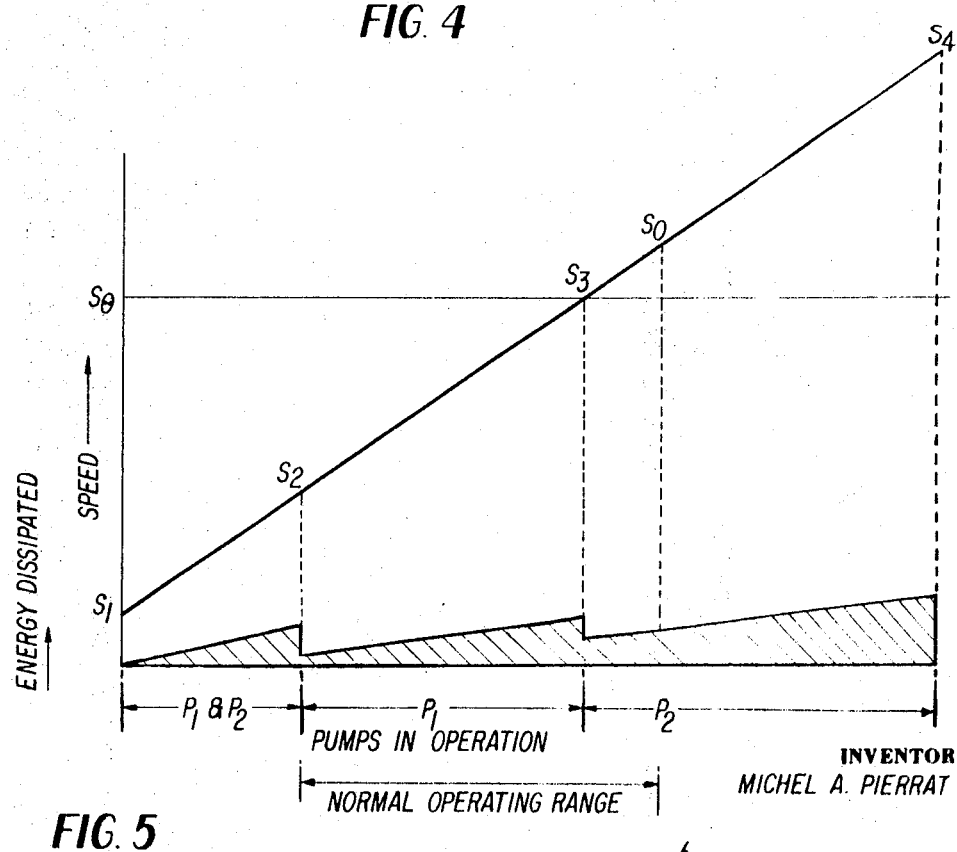
FIG. 5 is a graphical representation of relationships between input speed, pump operations, output speed, and energy dissipations, during various stages of operation of a constant-speed drive in accordance with the present invention.

Referring now to FIG. 5, it can be seen that the output speed S of the hydraulic motor is maintained essentially constant, while the input speed to the prime mover shaft 12 is allowed to range between a speed $S_1$ and a speed $S_4$. The energy dissipated in the main bypass for the hydraulic motor is illustratively represented by the crosshatched portion of the diagram in FIG. 5. It is seen that between a lowest prime mover speed $S_1$ and a somewhat higher speed $S_2$, both pumps P1 and P2 are utilized and the amount of energy dissipated will increase with the increase in speed until some selected maximum permissible level of energy dissipation has been reached, and then the output flow from pump P2 is bypassed. From speed $S_2$ to a yet higher speed $S_3$, only pump P1 is utilized, and the amount of energy dissipated in the bypass for the hydraulic motor will gradually increase to a second selected maximum permissible level at speed $S_3$. Once the prime mover reaches speed $S_3$, pump P1 has been cut out and pump P2 has been cut in instead, such that the reduced output flow from pump P2 will reduce the amount of energy dissipated to desirably low values. As the prime mover speed is increased still further, to $S_4$, the amount of energy dissipated within the circuit will again increase, to a selected maximum permissible level at speed $S_4$. It is to be noted that the speed ranges in which the various pumps are utilized will depend upon their capacities and the efficiencies sought for the system in the various speed ranges. Accordingly, if the normal operating range for the prime mover, such as an internal-combustion engine, is between speed $S_2$ and $S_0$, the pumps are preferably cycled for operation of the type represented in FIG. 5, wherein the maximum amount of energy dissipated during the normal operating range tends to be advantageously low. Had the hydraulic circuit merely included one pump, having a continuously increasing output as the speed of engine 10 increases, the amount of energy dissipated would continue to rise and the system efficiency would correspondingly decrease with increase in speed of the engine. The two pumps, with three cycles of operation, uniquely insure that the losses are kept low and the efficiency high.

The occurrences during decreases in speed of the prime mover are such as to achieve the reverse of the actions described for the increasing-speed conditions. When the system is operating in the third or high-speed range, for example, reduced input speed ultimately lowers the available output from pump P2 alone to a level where it is barely able to supply the needs of the hydraulic motor 24, and the higher-capacity pump P1 must then be put into active service at about prime mover speed $S_3$. This takes place automatically, because significantly reduced output from pump P2 results in significantly reduced pressure in bypass line 62 and pressure lines 70 and 90, thereby causing valve 48 to switch to a closed or OFF condition which no longer accommodates bypass flow in the line 44 which shunts pump P1. Appropriately, pump P2 then also has its bypass line 46 opened to flow as a result of opening of its valve 52 which responds to increased pressure applied to it via line 50 when pump P1 is no longer shunted. Valve 54 accommodates this flow in line 46 because it remains open or ON after having been opened earlier. Pump P1 continues in active operation, alone, in the intermediate range of operation, until its output is barely able to supply the needs of hydraulic motor 24, at which point, corresponding to prime mover speed $S_2$, the pump P2 is to be placed into cooperative service with it over the lowest or first range of operation. The latter effect is realized because the pressure in line 70 ultimately drops so low that valve 54 cannot further remain open or ON, and it therefore closes and thereby forces all of the output of pump P2 to join with that of pump P1 in supplying needs of hydraulic motor 24. In this manner, speed of the hydraulic motor is closely regulated, in a highly efficient manner (typically about 50 percent efficiency), without actually involving speed measurements at all.

Check valves 36 and 42 on the high-pressure sides of pumps P1 and P2 respectively prevent unwanted interactions which would otherwise prevent the pump bypass or shunting lines 44 and 46 from functioning independently.

The various pressure-responsive valves in the system may have structural features like those shown for valve 54 in FIG. 2, or may, alternatively, be of other types having the needed functional characteristics which are evident from the descriptions herein. In particular, it is to be observed that auxiliary control valve 72 is not necessary in all instances, and that it may be eliminated through appropriate selection of different pressure-response settings for valves 54 and 48. Orifice 56 and valve 58 may conveniently be combined as a single unit.

It should be understood that the specific practices and preferred embodiments herein referred to have been offered by way of disclosure, rather than limitation, and that various modifications, additions and substitutions may be effected by those skilled in the art without departure from these teachings; it is therefore aimed in the appended claims to embrace all such variations as fall within the true spirit and scope of this invention.

I claim:

1. Apparatus for producing a substantially constant-speed power output from a variable-speed power source comprising a rotary hydraulic motor, pump means driven by said variable-speed power source for simultaneously supplying to said hydraulic motor fluid flows at different rates which are related to speed of said source and which together are at least sufficient to drive said hydraulic motor at said substantially constant speed, said pump means comprising at least two constant-displacement rotary pumps both rotated by said power source at speeds related to speeds of said variable-speed source, the output from one of said pumps being greater than that from the other for the same speeds of said source, means for bypassing around said motor fluid supplied from said pump means in excess of that required to drive said hydraulic motor at said substantially constant speed, and means responsive to the flow through said bypass means controlling the supply of said fluid flows from said pump means to said hydraulic motor, said means controlling the supply of fluid flows from said pump means comprising means for independently bypassing each of said fluid flows through a low-loss path in response to fluid flow conditions in said means for bypassing fluid around said hydraulic motor.

2. Apparatus for producing a substantially constant-speed power output as set forth in claim 1 wherein said bypass means includes means restricting fluid flow from said pump means to said hydraulic motor, valve means responsive to fluid pressures associated with said restricting means, and bypass conduit means in fluid-flow communication with said pump means and the output side of said hydraulic motor through said valve means.

3. Apparatus for producing a substantially constant-speed power output as set forth in claim 1 wherein said means for independently bypassing each of said fluid flows includes relatively low-loss fluid bypass conduit means in shunting relation with each of said pumps, each of said bypass conduit means including valve means for opening and closing the conduit means to flow of fluid therethrough, and wherein said means controlling the supply of fluid flows from said pump means includes means sensing said fluid flow conditions in said bypassing means for said hydraulic motor and controlling said valve means in response to said fluid flow conditions.

4. Apparatus for producing a substantially constant-speed power output from a variable-speed power source comprising a rotary hydraulic motor, pump means driven by said variable-speed power source for simultaneously supplying to said hydraulic motor fluid flows at different rates which together are at least sufficient to drive said hydraulic motor at said substantially constant speed, said pump means comprising at least two constant-displacement rotary pumps both rotated by said power source at speeds related to speeds of said variable-speed source, the output from one of said pumps being greater than that from the other for the same speeds of said source, each of said pumps further including relatively low-loss fluid bypass conduit means in shunting relation therewith, each of said bypass conduit means including valve means for opening and closing the conduit means to flow of fluid therethrough, said valve means in one of said bypass conduit means further including a valve for opening and closing said one of said conduit means to fluid flow therethrough and further comprises means for actuating said valve to open and close said conduit means in response to fluid flow conditions in the other of said bypass conduit means, means for bypassing around said motor fluid supplied from said pump means in excess of that required to drive said hydraulic motor at said substantially constant speed, and means responsive to the flow through said bypass means controlling the supply of said fluid flows from said pump means to said hydraulic motor, said means controlling the supply of fluid flows from said pump means including means sensing fluid flow conditions in said bypassing means for said hydraulic motor and controlling said valve means in response to said fluid flow conditions.

5. Apparatus for efficiently producing a substantially constant-speed rotational power output from a variable-speed rotational power source, comprising a rotary constant-displacement hydraulic motor, a plurality of constant-displacement rotary pumps, means connecting said pumps for rotation by said source at speeds related to speeds of said source, the outputs from said pumps being at different fluid flow rates for the same speeds of said source and the combined fluid flow outputs of said pumps being in excess of fluid flow needed to drive said hydraulic motor at said substantially constant speed when the speed of said source is at a minimum, closed-loop fluid conduit means for connecting said pumps in parallel fluid-supplying relationship with said hydraulic motor, means restricting fluid flow through said conduit means and developing related fluid pressures, a pressure-actuated valve responsive to said pressures, a fluid bypass path in shunting relation to said hydraulic motor through said valve and bypassing all fluid in excess of fluid needed to drive said motor at said substantially constant speed, means for independently bypassing the outputs from each of said pumps in a relatively low-energy-loss closed recirculation path including that pump, each of said recirculation paths including valve means for opening and closing that path, and means responsive to fluid flow through said bypass path controlling said valve means in each of said recirculation paths and thereby controlling the rates at which fluid is pumped through said conduit means while said power source rotates at different speeds.

6. Apparatus for efficiently producing a substantially constant-speed rotational power output as set forth in claim 5 wherein said closed-loop fluid conduit means includes a heat-exchanger in series therewith and is filled with a substantially incompressible liquid, and wherein said constant-displacement pumps comprise two pumps one of which delivers pumped liquid output at a higher rate than the other for the same speeds of said source.

7. Apparatus for efficiently producing a substantially constant-speed rotational power output as set forth in claim 6 wherein said valve means in said recirculation paths are pressure-actuated, wherein said bypass path includes restriction means for promoting pressures therein related to the rates of bypass liquid flow therethrough, and wherein said means for controlling said valve means includes means sensing pressures in said bypass path and applying said pressures to said valve means.

8. Apparatus for efficiently producing a substantially constant-speed rotational power output as set forth in claim 7 wherein each of said recirculation paths for said two pumps includes a pressure-actuated valve which is normally closed and blocks liquid flow therethrough when the sensed pressures in said bypass path are relatively low and which is opened and conducts liquid flow therethrough when the sensed pressures in said bypass path are relatively high, and wherein said recirculation path for one of said pumps includes a further pressure-actuated valve for opening and closing that path, said further valve being responsive to pressures in the recirculation path for the other of said pumps.

9. Apparatus for efficiently producing a substantially constant-speed rotational power output as set forth in claim 8 wherein said further valve is in the recirculation path for the pump which delivers liquid output at the lower rate.

10. Apparatus for efficiently producing a substantially constant-speed rotational power output as set forth in claim 9 wherein said pressure-actuated valve in the recirculation path for said pump which delivers liquid output at said lower rate and which is responsive to sensed pressures in said bypass path is a valve which opens from a closed condition only upon occurrence of a relatively high sensed pressure and thereafter remains open until the sensed pressure is low in relation to said high pressure.

11. Apparatus for efficiently producing a substantially constant-speed rotational power output as set forth in claim 8 further comprising a pair of check valves each independently in series with a different one of said pumps on the high-pressure side thereof in downstream relation to the recirculation path therefor.

12. Apparatus for efficiently producing a substantially constant-speed rotational power output as set forth in claim 11 wherein said variable-speed rotational power source comprises a vehicle engine, wherein said minimum speed comprises idling speed of said engine, further comprising an alternator driven by said hydraulic motor and producing alternating current outputs to an electrical supply line at a commercial power frequency, and electrical switching means for disconnecting said alternator from said supply line and for electrically connecting said supply line with a power line delivering electrical power at said commercial power frequency.